May 15, 1945.  R. L. HOOD  2,376,311
PHOTOELECTRIC RECORDING SYSTEM
Filed March 21, 1942  4 Sheets-Sheet 1

INVENTOR.
ROBERT L. HOOD,
BY Elmer W. Harmon
ATTORNEY.

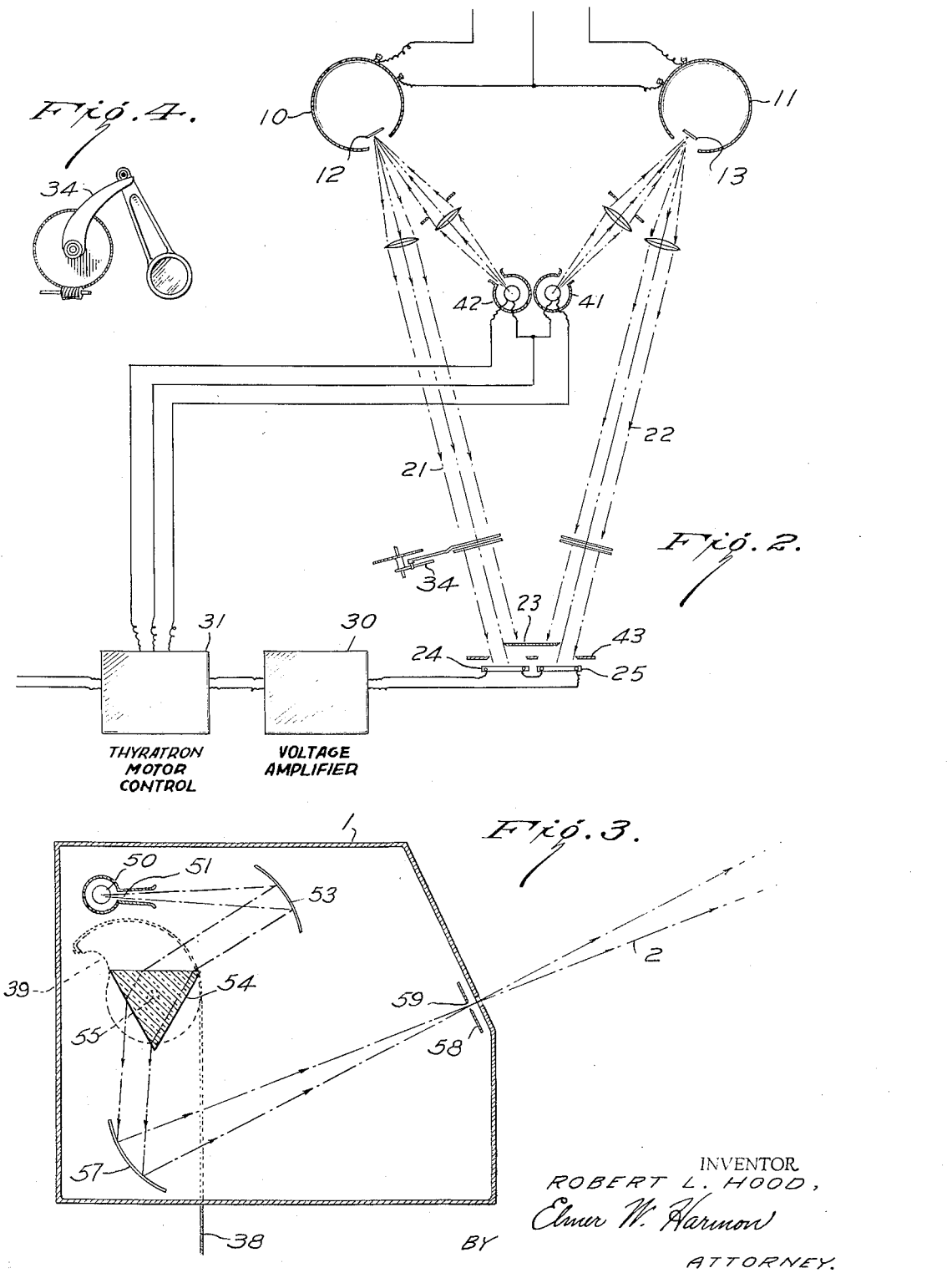

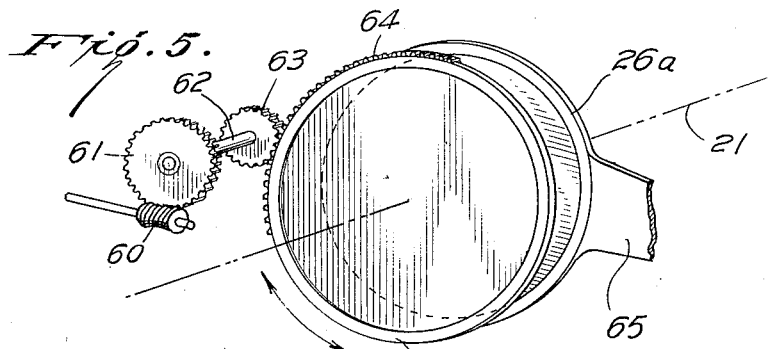
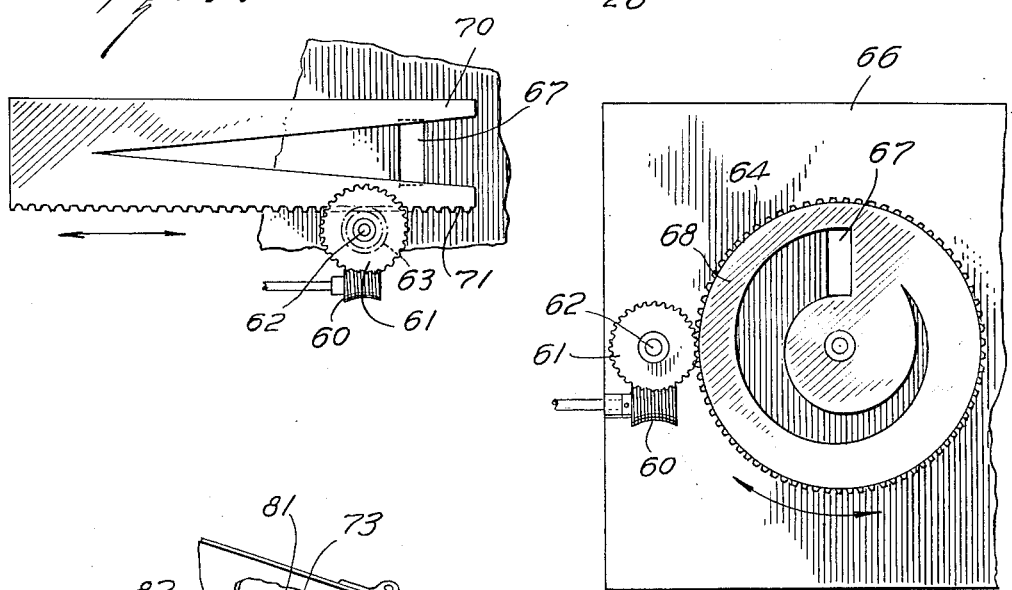
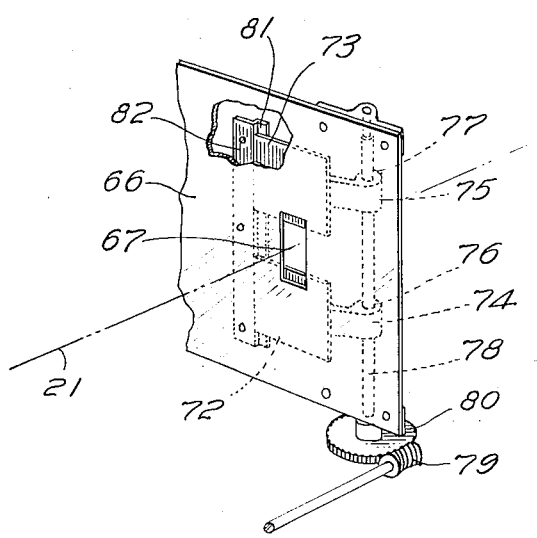

May 15, 1945.   R. L. HOOD   2,376,311
PHOTOELECTRIC RECORDING SYSTEM
Filed March 21, 1942   4 Sheets-Sheet 4

INVENTOR
ROBERT L. HOOD,
BY Elmer W. Harmon
ATTORNEY

Patented May 15, 1945

2,376,311

UNITED STATES PATENT OFFICE 2,376,311

PHOTOELECTRIC RECORDING SYSTEM

Robert L. Hood, Stamford, Conn., assignor to American Cyanamid Company, New York, N. Y., a corporation of Maine Application March 21, 1942, Serial No. 435,713

9 Claims. (Cl. 250—43)

This invention relates to photoelectric recording systems, particularly for mechanically recording a function of the temperature differential between two temperature responsive means.

The object of the invention is to provide an improved recording system capable of directly recording some function of the temperature differential such as the percentage mismatch between two temperature responsive devices, particularly between such devices as thermocouples.

One important application of such a device is in the field of infrared spectrophotometry. Infrared spectrophotometry covering the absorption spectrum in the wave-length range from about one $\mu$ to 300 $\mu$ has become increasingly important in research and testing laboratories because of the ease with which it can solve problems which are otherwise either very difficult or impossible to solve. Particularly is it useful in analytical work since it can be used with a very small sample and without contaminating the sample.

However, in actual practice the use of infrared spectrophotometry must overcome certain mechanical difficulties. Since radiation in this range is a form of heat rather than visible light, the readings are dependent upon a thermocouple or some similar device, the operation of which depends on temperature differences. One limitation on the use of the thermocouple is that the reaction of the thermocouple is much slower than the reaction of a photocell or phototube such as can be used in connection with visible light.

While several types of apparatus for measuring and recording infrared absorption are known, the best recording practice prior to the present invention required that two successive records be made, first a blank and then with a sample in place. The two records so made, usually in the form of a plot of intensity vs. frequency must then be graphically compared and the difference in absorption at each frequency calculated, and this difference, usually in terms of percent transmission vs. frequency, replotted by hand. While this produces accurate results, it requires considerable time and subjects the whole recording to possible error in transcription.

The device of the present invention can be used in such a case to record directly the percent transmission vs. frequency, or any other desired function of the temperature differential, and thus eliminate the necessity for making two records and then going through the steps of graphical and mathematical interpretation.

In general the device of the present invention comprises a combination of means whereby variations in the temperature differential between two temperature responsive devices are made to cause proportional changes in the direction of two beams of visible light, means whereby the changes in direction of the two beams of visible light cause corresponding electrical impulses in an electrical circuit and means for measuring and recording these changes in the direction and intensity of the electrical impulses. Since the electrical impulse variations will be proportional to changes in the visible light beams and changes in the latter will be proportional to the changes in the temperature difference between the temperature sensitive devices, the record of the electrical impulse changes will also be a function of the changes in the temperature differential which it was desired to obtain.

The invention will be more fully discussed in connection with the drawings in which:

Figure 2 shows another modification of the device of Figure 1 making use of two sources of visible light;

Figure 3 shows in detail one means whereby the monochromatic infrared beam is generated;

Figure 4 is an enlarged portion of Figure 1 showing one means of varying the intensity of the light beams;

Figure 1:
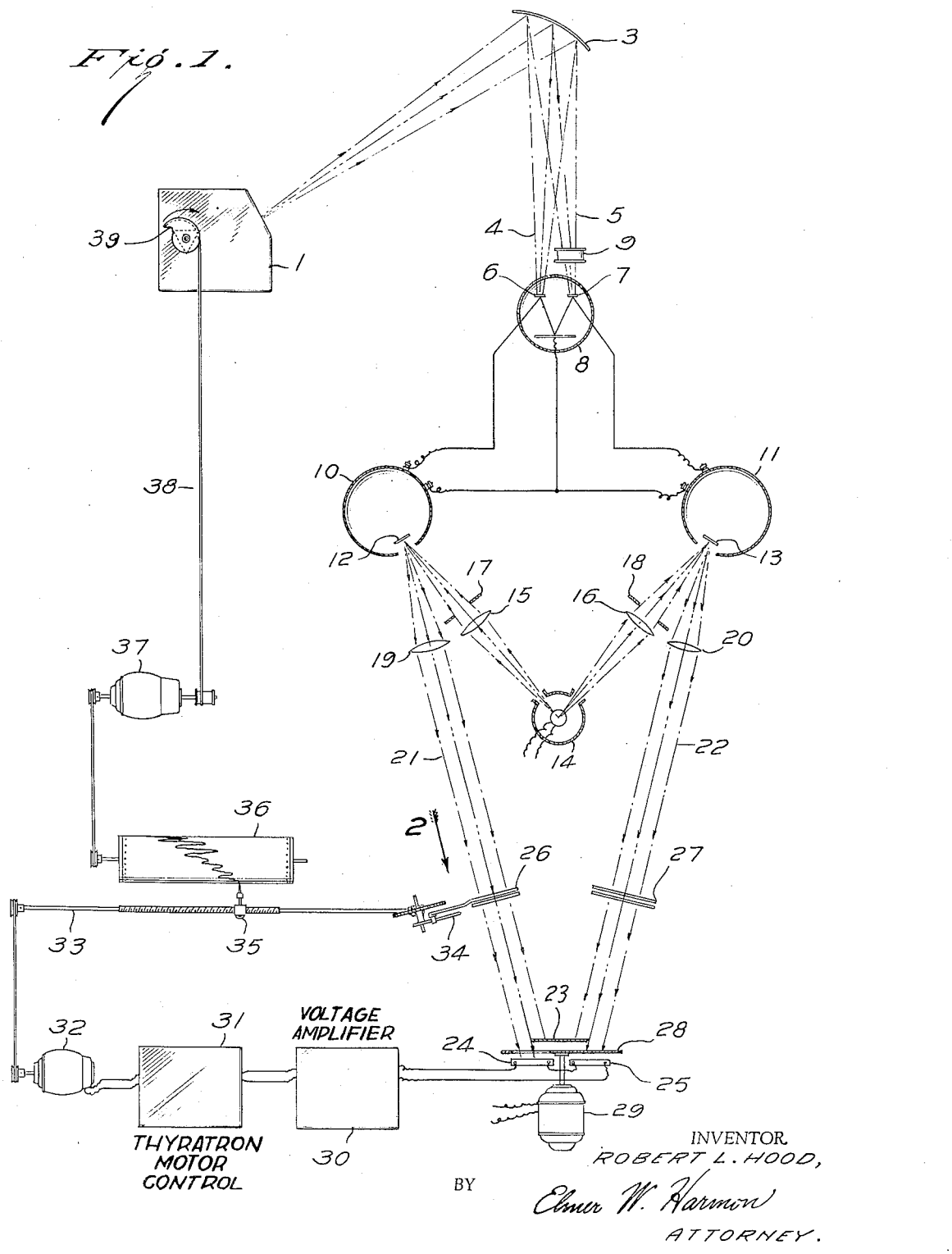
Figure 1 shows one form of an infrared spectrophotometer which embodies the present invention, the various components being diagrammatically represented.

Figures 5, 6, 7 and 8 are detailed portions of the devices of Figures 1 and 2 showing various modifications for regulating the strength of the standard beam; and Figures 9, 10, 11 and 12 are detailed portions of the devices of Figures 1 and 2 showing various modifications whereby the flickering action is obtained.

With reference to Figure 1, 1 represents a monochromator emitting a beam of infrared energy 2, which is reflected from split mirror 3 as two convergent beams 4 and 5 of approximately equal cross-section, intensity and frequency which impinge respectively upon two thermocouples 6 and 7, preferably closely matched and enclosed within a tube 8. Interposed in the path of the beam 5 is a sample holder 9 constructed of some material such as quartz or rock salt which is transparent to the infrared radiations. The thermocouples are connected to two galvanometers 10 and 11 having deflecting mirrors 12 and 13 in such a manner that variations in the energy received by either of the thermocouples 6 and 7 will cause opposed deflection of the mirrors 12 and 13. Each of the galvanometers is so matched with its corresponding thermocouple that they deflect equally over similar temperature ranges. This may be done by any desired means such as the insertion of appropriate resistances in the circuit.

Visible light from a source 14 is concentrated by lenses 15 and 16 into two beams which are passed respectively through apertures 17 and 18 onto the mirrors 12 and 13 from which they are reflected through lenses 19 and 20 as two convergent beams of parallel light 21 and 22, which pass across the knife edges of plate 23 and strike upon the surfaces of two opposed photocells 24 and 25. Interposed in the paths of the beams 21 and 22 are two pairs of polaroid discs 26 and 27 respectively. Interposed between the plate 23 and the two photocells 24 and 25 is a rotating half-wave plate 28 which is rotated at constant speed by motor 29.

By this arrangement when the galvanometers are reflecting light equally, light falls upon equal surface areas of the two photocells 24 and 25 alternately at 180° out of phase, at a frequency equal to the speed of motor 29, thereby setting up balanced, opposing alternating components in the photocells. When the galvanometers deflect differently, light will fall on unequal surface areas of the photocells, thus setting up an unbalanced alternating component which is amplified by means of a suitable voltage amplifier 30 which in turn drives a series of thyratrons 31 arranged in such a way so as to control the direction of rotation of motor 32 through phase relation, the motor 32 being tuned to operate at the frequency determined by the speed of motor 29.

By means of a suitable belt and pulley mechanism the motor 32 rotates a shaft 33 and cam 34 which in turn rotate one of the polaroid discs of the pair 26 thereby adjusting the amount of light passing through that pair of discs so that an equal amount of light energy will be again received by the two photocells 24 and 25 and thereby remove the unbalanced alternating component and stop the motor 32. The deflection of the galvanometers in the opposite direction will produce a corresponding change in the relative position and therefore the amount of light transmitted by the two discs comprising the pair 26. Minor adjustments to equalize the original intensity of light beams 21 and 22 may be made by means of the pair of polaroid discs 27.

A portion of the shaft 33 is screw threaded to form a drive for the pen holder 35 which carries a pen which in turn records variations in the adjustments of the polaroid discs on a sheet of paper carried by a suitable drum 36. The drum 36 is rotated at a constant speed by motor 37 which also by a drum and belt 38 rotates cam 39 and thereby varies the frequency of the beam 2 emitted by the monochromator 1. The motor 37 is so connected to the drum 36 and monochromator 1 that one revolution of the drum 36 is made each time the monochromator varies the frequency of the beam 2 through one cycle.

Figure 2 represents a modification of the spectrophotometer of Figure 1 in which the "flicker" is produced by a different means, the single light source 14 of Figure 1 being replaced by two mercury lamps 41 and 42 operated from a center-trapped transformer which will modulate the two lights 180° out of phase. By this means the flicker vane 28 and motor 29 of Figure 1 may be dispensed with. However, a double opening diaphragm 43 will be required to limit the area on the photo cells 24 and 25 upon which light may fall. In order to insure the proper phase relation between the mercury lights and the rest of the apparatus, the transformer for the lights and the thyratron plate supply transformer can be wound upon the same core. The leads are so shown in Figure 2.

Figure 3 shows one form of an infrared beam generator. A source of infrared energy 50, such as a hot wire or the like, is so located that infrared energy passes out through slit 51, falls on mirror 53 and is reflected as a parallel beam onto a prism 54 made of some material such as quartz or rock salt or the like which is transparent to infrared radiations. The prism 54 is so mounted that it may be rotated through a portion of circular path by rotating shaft 55 which in turn is motivated by cam 39 driven by belt 38. The infrared energy passing through the prism will fall upon mirror 57 and be reflected through slot 59 in plate 58 as the divergent beam 2, the further path of which is shown in Figure 1.

An inspection of the diagrammatic arrangement will show that as the wave length progressively increases, the infrared beam 4 will produce a response in thermocouple 6 similar to that produced in the thermocouple of a conventional single beam apparatus; and that simultaneously the beam 5 passing through the sample produces a response in thermocouple 7 equivalent to that produced in the thermocouple of a single beam apparatus when a sample is in place. Thermocouples 6 and 7 being connected through the galvanometers produce a compound deflection which is directly proportional to the difference between the intensities of the two beams 4 and 5. If the two pairs of polaroid discs 26 and 27 are suitably adjusted to compensate for slight variations in beams 21 and 22 and there is no sample in the sample holder 9, light beams of equal intensity fall upon equal areas of the surface of both photocells 24 and 25. If a sample is then placed in the sample holder a variation in the deflection of both galvanometers will occur and will be proportional to the amount of energy absorbed by the sample at that particular wave length.

This deflection will not vary the intensity of the beams of visible light falling upon the photocells 24 and 25, but will cause the beams to strike different areas on the surface of the photocells. As pointed out above, this will cause an unbalanced alternating component to be set up which will operate the motor 32 through the amplifier 30. The motor will then cause cam 34 to be moved and thereby adjust the relative positions of the two polaroid discs of the pair 26 so that the intensity of the beam passing through that pair will be such that an equal quantity of energy will fall on both photocells even though upon different areas of each and thereby bring the alternating components into balance. Since the variation in adjustment of the positions of the discs will be proportional to the deflection of the galvanometers which in turn were proportional to the difference in the intensities of the infrared beams 4 and 5 as they fall upon the couples, the recording of these adjustments made by the pen 35 will be a plot of some function of the difference or mismatch between the two thermocouples.

The particular function of the temperature differential which is plotted will depend upon the cams 34 and 39 which are used. For example, if it is desired to plot the percent of transmission of the sample vs. frequency the following limitations must be met. Both the ordinate and abscissa of the desired plot are uniform linear functions, but equi-angular displacements of the polaroid disc through one quadrant will not produce equal increments in the amount of light being passed, and equi-angular displacement of the prism 54 will not produce linearly responsive variations in frequency. Therefore both cam 34 and cam 39 must be adapted to make the necessary conversion from angular displacement to uniform linear displacement. If some function other than a linear one is to be plotted the cam profiles must be suitably adapted. Examples of such non-linear cams are well illustrated in U. S. Letters Patent Nos. 2,176,013 and 2,218,357 issued Oct. 10, 1939, and Oct. 15, 1940, respectively to Orrin W. Pineo.

If in addition, it is desirable to plot on a non-uniform scale in order to magnify parts of either ordinate or abscissa other adjustments must be made in the cams. The ordinate may be compensated by inserting an appropriate cam to regulate the speed of drum 36. The abscissae may be modified by using an appropriate cam 34 on the monochromator.

It will be apparent that a number of changes in the apparatus can be made without departing from the scope of this invention. For example, the movable disc of the pair of polaroid discs in Figure 1, instead of being driven by the cam and lever arrangement 34, may be driven, as in Figure 5, by a worm 60 which drives gear 61, shaft 62 and gear 63, the latter acting upon rack 64 on the outer periphery of disc 26. Also, the fixed disc 26a may be provided with a lug 65 to serve as an index and permit a rotary adjustment thereof if so desired.

Again, if so desired, the pairs of discs 26 may be replaced by a plate 66 having an aperture 67 therein, through which light beam 21 passes. The effective aperture opening may be regulated by a rotary shutter 68, which, like disc 26 is driven by rack 64 on its outer periphery which in turn may be driven by the same worm and gear arrangement as in Figure 5. Another arrangement is shown in Figure 7 in which the effective opening of the aperture 67 is adjusted by means of a light wedge 70 driven by means of a rack 71 along one side thereof, the rack being moved by means of the same worm 60, gear 61, shaft 62 and gear 63 arrangement used in Figure 5.

Again, the aperture opening may be adjusted as in Figure 8 by means of two shutters 72 and 73. These are moved by two lugs 74 and 75 having oppositely threaded holes 76 and 77 therein, one lug being threaded over each of the opposing threads of screw 74 which is rotated by means of worm 79 and gear 80. Rotation of shutters 72 and 73 is prevented by means of a groove 81 in a guide strip 82.

Figure 9:
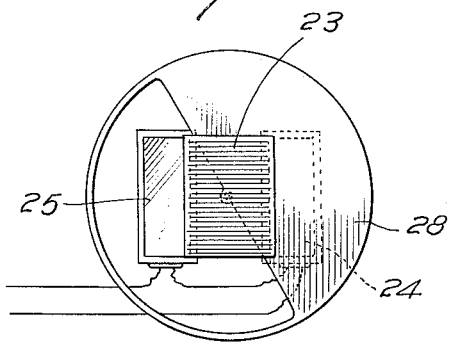
Figure 10:
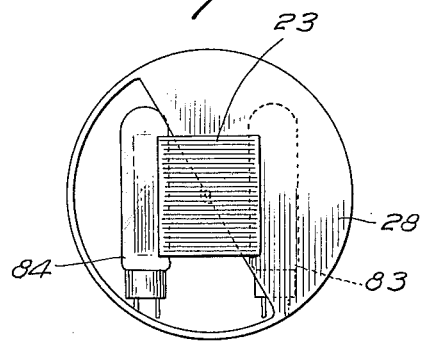
Figure 12:
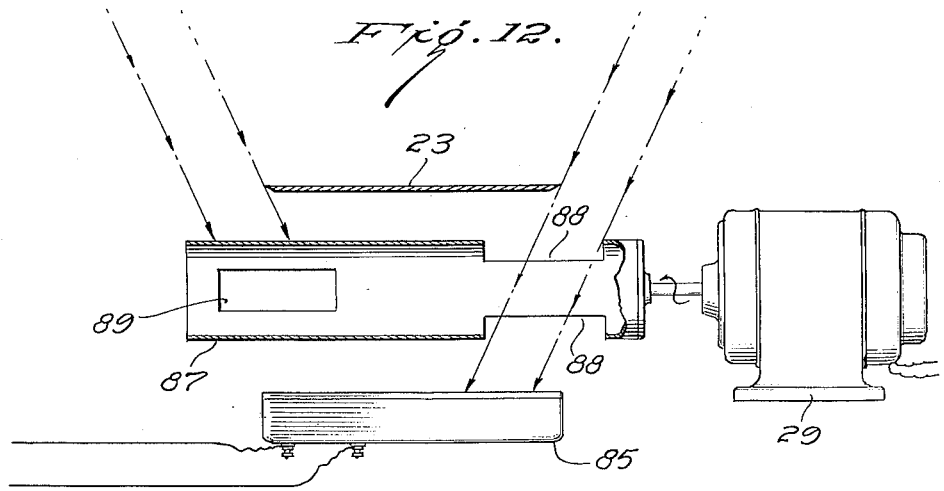
Figure 11:
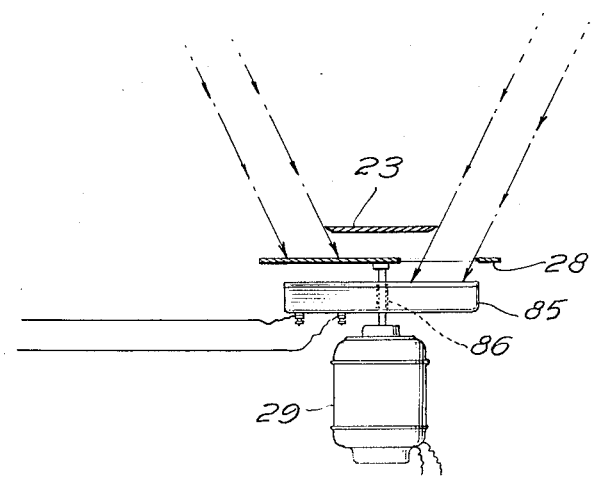

Similarly, a number of variations in the arrangement of photocells 24 and 25 and the flicker vane 28 may be made if so desired. A vertical view, partly in section, of the flickering arrangement of Figure 1 is shown in Figure 9. It can be modified by substituting phototubes 83 and 84 for the photocells 24 and 25 as in Figure 10. Again as in Figure 11, photocells 24 and 25 may be replaced by a single large photocell 85, the flicker vane 28 being driven by a shaft through a center opening 86 in the photocell. A still further modification is shown in Figure 12 in which flicker vane 28 is replaced by a rotary drum 87 which is turned by motor 29 and causes the flickering by means of two pairs of apertures 88 and 89, a center line running through the openings of one pair being at an angle from 90° to a center line running through the openings of the other pair.

The recording device is not limited to use with an infrared spectrophotometer to which the present discussion has been largely limited. For example, it is of equal utility in a case where it is desirable to measure the percentage difference in temperature between the two parts of any reaction vessel or where it is desired to know the drop in temperature along a path of fluid flow so that the heat losses can be compensated for. A number of possible uses can be developed with reference to particular types of processes or forms of apparatus without departing from the scope of the present invention.

I claim:

1. A device for recording a function of the temperature differential between two temperature responsive devices including in combination, means for converting changes in temperature differential into proportional changes in direction of two beams of visible light, means for converting the directional changes in the light beams into proportional changes in electrical energy and means for progressively recording a function of the changes in electrical energy.

2. A device for recording a function of the temperature differential between two temperature responsive devices including in combination, means for converting changes in temperature differential into proportional changes in direction of two beams of visible light, means for modulating the light beams 180° out of phase at a constant frequency, photoelectric means for converting the modulated light beams into opposed alternating electrical components having a frequency equal to that at which the light is modulated, means whereby variations in the light beams unbalance the alternating components, photometering means responsive to the unbalanced alternating components to eliminate the unbalanced components and means to progressively record a function of the changes in adjustment of the photometering means.

3. A device for recording a function of the differential between two temperature-responsive devices capable of developing electrical energy comprising a pair of electrical energy measuring devices each having a movable indicator carrying a light reflecting element, means connecting said temperature responsive devices to said electrical energy measuring devices whereby changes in the temperature differential between said temperature responsive devices produce opposed deflections of said movable indicators, each of said electrical energy measuring devices being so matched with its corresponding temperature responsive device that similar deflections of said movable indicators are produced over similar temperature ranges, means for focusing a beam of visible light upon each of said light reflecting elements, adjustable photometering means the adjustment of which varies the relative intensity of beams of light reflected from said light reflecting elements, light responsive means for receiving said beams of reflected light, means controlled by said light responsive means to adjust said photometering means to equalize the intensity of said reflected beams and means for recording the progressive adjustment of said photometering means.

4. A device for recording the percentage differential between two temperature-responsive devices capable of developing electrical energy comprising a pair of electrical energy measuring devices each having a movable indicator carrying a light reflecting element; means connecting said temperature responsive devices to said electrical energy measuring devices whereby changes in the temperature differential between said temperature responsive devices produce opposed deflections of said movable indicators; means for focusing a beam of visible light upon each of said light reflecting elements; adjustable photometering means the adjustment of which varies relative intensity of beams of light reflected from said light reflecting elements; light responsive means for receiving said beams of reflected light; means for limiting the surface area of said light responsive means upon which said beams are received; means for interrupting the beams of reflected light falling upon the light responsive means alternately 180° out of phase, whereby an unbalanced alternating component is impressed on said light responsive means when said light responsive means receive unequal amounts of light energy; means for amplifying said alternating component, means actuated by said amplified component for adjusting said photometering device to equalize the light energy received by said light responsive means for recording the amount of said adjustment.

5. A device as in claim 4 in which the means for alternating the beams of reflected light include a rotatable half-wave plate and means for rotating said plate at constant speed.

6. A device as in claim 4 in which the means for alternating the beams of reflected light include a separate light source for each reflecting element and means for supplying light from said separate sources alternately at a fixed period.

7. A device as in claim 3 in which the photometering means comprises a pair of parallel plane polarizing discs interposed in the path of each beam of reflected light.

8. An infrared photometer capable of directly recording the percentage of radiant energy absorbed by a sample at different wave lengths as the wave length is progressively varied through a range of about $1\mu$ to about $300\mu$ which comprises means for producing two beams of infrared energy of the same length and intensity, means for simultaneously varying the wave-length of the two beams, a temperature-responsive device interposed in the path of each of said beams, means for interposing a sample in the path of one of said beams whereby the infrared energy received by the two temperature responsive devices differs by the amount absorbed by the sample, means for converting changes in temperature differential into proportional changes in two beams of visible light, means for converting changes in the light beams into proportional changes in electrical energy and means for progressively recording a function of the changes in electrical energy.

9. An infrared photometer capable of directly recording the percentage of radiant energy absorbed by a sample at different wave lengths as the wave length is progressively varied through a range of about $1\mu$ to $300\mu$ which comprises means for producing two beams of infrared energy of substantially the same wave length and intensity, means for simultaneously varying the wave-length of the two beams, a temperature-responsive device capable of developing electrical energy interposed in the path of each of said beams, means for interposing a sample in the path of one of said beams whereby the infrared energy received by the two temperature responsive devices differs by the amount absorbed by the sample, a pair of electrical energy measuring devices each having a movable indicator carrying a light reflecting element, means connecting said temperature responsive devices to said electrical energy measuring devices whereby changes in the temperature differential between said temperature responsive devices produce opposed deflections of said movable indicators, each of said electrical energy measuring devices being so matched with its corresponding temperature responsive device that similar deflections of said movable indicators are produced over similar temperature ranges, means for focusing a beam of visible light upon each of said light reflecting elements, adjustable photometering means the adjustment of which varies the relative intensity of beams of light reflected from said light reflecting elements, light responsive means for receiving said beams of reflected light, means controlled by said light responsive means to adjust said photometering means to equalize the light energy received by said light responsive means and means for recording progressive adjustment of said photometering means.

ROBERT L. HOOD.